United States Patent [19]
Cody et al.

[11] Patent Number: 5,264,515
[45] Date of Patent: * Nov. 23, 1993

[54] MOISTURE CURABLE COMPOSITIONS AND METHOD OF CURING MOISTURE CURABLE COMPOSITIONS

[75] Inventors: Charles A. Cody, Robbinsville; Terrence L. Hartman, Franklin Park, both of N.J.

[73] Assignee: Rheox, Inc., Highstown, N.J.

[*] Notice: The portion of the term of this patent subsequent to Dec. 24, 2008 has been disclaimed.

[21] Appl. No.: 812,110

[22] Filed: Dec. 23, 1991

Related U.S. Application Data

[63] Continuation-in-part of Ser. No. 336,002, Apr. 10, 1989, Pat. No. 5,075,407.

[51] Int. Cl.$^5$ .............. C08G 77/00; C08G 18/10; C08G 75/14; C08G 63/48
[52] U.S. Cl. .............. 528/10; 522/172; 522/173; 522/174; 525/453; 525/54.22; 526/297; 527/301; 528/59; 528/71; 528/388
[58] Field of Search .............. 528/388, 59, 71, 10; 525/453, 54.22; 526/297; 522/172, 174, 173; 527/301

[56] References Cited

U.S. PATENT DOCUMENTS

| | | | |
|---|---|---|---|
| 3,659,896 | 5/1972 | Smith et al. | 524/881 |
| 3,697,622 | 10/1972 | Kehr et al. | 528/75 |
| 3,705,132 | 12/1972 | Cuscurida | 528/288 |
| 3,714,132 | 1/1973 | Nakanishi et al. | 524/858 |
| 3,725,501 | 4/1973 | Hilbelink et al. | 528/73 |
| 3,912,696 | 10/1975 | Doughty | 528/293 |
| 4,100,148 | 7/1978 | Hockenberger et al. | 528/374 |
| 4,238,585 | 12/1980 | Bertozzi | 528/388 |
| 4,511,626 | 4/1985 | Schumacher | 528/52 |
| 4,690,953 | 9/1987 | Orr et al. | 521/65 |
| 4,775,719 | 10/1988 | Markevka et al. | 525/125 |
| 4,810,748 | 3/1989 | Spells | 524/788 |
| 4,870,130 | 9/1989 | Achtenberg et al. | 524/788 |
| 4,978,706 | 12/1990 | Dietlein et al. | 524/788 |
| 5,075,407 | 12/1991 | Cody et al. | 528/71 |

Primary Examiner—John Kight, III
Assistant Examiner—T. Mosley
Attorney, Agent, or Firm—Michael J. Cronin

[57] ABSTRACT

A moisture curable composition comprised of a moisture curable base and a curing agent which does not contain molecular water but which produces water upon activation so as to cure the curable base. The composition exhibits improved stability and shelf life and can be formulated so that curing of the composition can be controlled substantially independently of ambient conditions.

35 Claims, No Drawings

MOISTURE CURABLE COMPOSITIONS AND METHOD OF CURING MOISTURE CURABLE COMPOSITIONS

CROSS REFERENCE TO RELATED APPLICATION

This is a continuation-in-part, of application Ser. No. 07/336,002, filed on Apr. 10, 1989, now U.S. Pat. No. 5,075,407.

BACKGROUND OF THE INVENTION

1. Field of the Invention

The present invention relates to moisture curable compositions and a method of curing moisture curable compositions.

2. Description of Related Art

It is well known that moisture can be used as agent in various systems. In some instances, the water reacts with certain functional groups so as to form part of the linking group. In other instances, the water provides the accelerator, catalyst or vehicle by which curing is achieved. Of the known moisture curable compositions, moisture curable polyurethanes are used for a variety of purposes. For example, moisture curable polyurethanes have been used as adhesives. However, one component, moisture curable adhesive compositions cure fairly slowly due to dependence on relative humidity and the rate of diffusion of atmospheric moisture into the bondline. Further, fixturing may be required.

U.S. Pat. No. 4,511,626 describes one-component, moisture-curable polyurethane adhesive, sealant and coating compositions useful in bonding articles to substrates. The compositions contain (a) prepolymer(s) derived from 4,4'-diphenylmethane diisocyanate, or isocyanate functional derivative(s) of 4,4'-diphenylmethane diisocyanate, and polyol(s) containing hydroxyl groups, and (b) bis[2-(N,N-dialkylamino)alkyl]ethers. The compositions require several days for cure-through by atmospheric moisture.

In U.S. Pat. No. 3,705,132, a moisture curable polyurethane coating composition is disclosed. The excess isocyanate groups in the composition react with moisture in the atmosphere in order to effect curing.

Published PCT Application No. WO 90/06332 discloses compounds which crosslink under the action of humidity and which cure through moisture generating compounds that contain molecular water dispersed into the base material and are activated by heating.

Certain silicone compositions can also be cured in the presence of water. For example, in U.S. Pat. No. 4,810,748, a silicone sealant composition is described which bonds to dolomite containing concrete after exposure to moisture. The composition is obtained by adding a silicone fluid having greater than 2 mole percent epoxy functionality to a sealant containing a hydroxyl endblocked polydiorganosiloxane, acetamidosilane chain extender, and crosslinking agent selected from the group consisting of triacetamidosilane and aminoxysilicon compound. The moisture for curing the composition is obtained from the atmosphere.

U.S. Pat. No. 4,978,706 describes a further silicone composition that is stable in the absence of moisture, but cures to an elastomer upon exposure to moisture, while U.S. Pat. No. 4,870,130 describes polysiloxane compositions which harden in the presence of moisture by elimination of alcohols and that are improved by the presence of stabilizing silyl derivatives of N-methyl benzamide.

Certain polysulfide compositions may also be cured in the presence of moisture. For instance, U.S. Pat. No. 3,659,896 describes an automobile windshield mounting and sealing means that is provided by a preformed, adhesive, curable sealing strip comprising a thiol terminated synthetic polymer, particularly a liquid polysulfide polymer. The polymer cures in the presence of atmospheric moisture under ambient room temperature and weather conditions.

U.S. Pat. No. 3,912,696 discloses a stable unitary liquid polymer composition that is protected from moisture and is capable of being shipped and stored in a single container. The composition can be deposited without agitation or intermixing with other materials and can be completely cured by contact with surroundings containing essentially only moisture. The composition essentially comprises a liquid polyalkylene polysulfide polymer containing a dispersed dormant curing agent which is activated by the presence of moisture and is present in amounts sufficient to cure the polymer and an alkaline desiccating deliquescent accelerating agent which maintains the polymer in dry condition during shipment and storage and attracts moisture from its surroundings after deposition in place to hasten the curing of the polymer by the curing agent.

U.S. Pat. No. 3,714,132 describes a unitary polysulfide polymer composition protected from moisture and capable of being stored in a stable condition in a single container without undergoing curing while being capable of being cured on contact with moisture in the atmosphere.

Despite developments in the art, there still exists a need for a moisture curable composition which is stable over time, but which effectively cures upon activation.

SUMMARY OF THE INVENTION

The present invention addresses the problems and disadvantages of the prior art by providing an improved moisture curable composition.

It is therefore one object of the present invention to provide a moisture curable composition that is relatively stable.

It is another object of the present invention to provide a moisture curable composition that has extended shelf life.

It is a further object of the present invention to provide a moisture curable composition that can be cured under controlled conditions.

It is an additional object of the present invention to provide a moisture curable composition where in situ moisture curing lessens dependence on atmospheric moisture which must diffuse through the curing mass to be effective.

It is another object of the invention to provide an adhesive composition that can exhibit acceptable adhesive properties.

It is yet another object of the present invention to provide a moisture curable composition that can exhibit acceptable green strength to reduce the need for fixturing of a bonded assembly.

It is still another object of the present invention to provide a method of curing a moisture curable composition.

It is still another object of the present invention to provide a method of curing a moisture curable composition wherein curing can be controlled.

It is still another object of the present invention to provide a method of curing a moisture curable composition that is substantially independent of ambient moisture conditions.

Additional objects and advantages of the invention will be set forth in part in the description which follows, and in part will be obvious from the description, or may be learned by practice of the invention. The objects and advantages of the invention will be realized and attained by means of the instrumentalities and combinations, particularly pointed out in the appended claims.

To achieve the objects and in accordance with the purpose of the invention, as embodied and broadly described herein, one aspect of the invention provides a moisture curable composition comprising a moisture curable base and a curing agent which substantially does not contain molecular water, but which produces water upon activation.

DESCRIPTION OF THE PREFERRED EMBODIMENTS

As stated hereinabove, one aspect of the present invention relates to a moisture curable composition comprising a moisture curable base and a curing agent. The moisture curable base can be any substance which cures in the presence of water. Such moisture curable bases include substances that contain functional groups that react with water as well as substances wherein the water does not directly react, but which functions as an accelerator, a catalyst or a vehicle for curing to occur.

Moisture curable polyurethane resins are a preferred type of moisture curable base and can be prepared from various reaction components. For example, the polyurethane resin can be prepared by reacting a stoichiometric excess of at least one polyisocyanate compound with at least one polyol compound to form a prepolymer. The stoichiometric excess of the polyisocyanate compound produces isocyanate terminated chains on the prepolymer that can be reacted with water molecules to form urea linkages with the liberation of carbon dioxide.

Exemplary suitable polyisocyanate compounds useful for preparing a polyurethane base resin for use in the present invention include aromatic, aliphatic, cycloaliphatic, and aralkyl polyisocyanate compounds containing from about 6 to about 100 carbon atoms. The term "aliphatic polyisocyanate" as used herein includes any organic polyisocyanate compound in which the isocyanate groups are attached to saturated carbon atoms. Preferably, the polyisocyanate compound employed contains two isocyanate groups, however, polyisocyanate compounds containing greater than two isocyanate groups are suitable for use in preparing the polyurethane resin of the invention providing that the resulting prepolymer is a liquid or thermoplastic solid. A mixture or a blend of more than one polyisocyanate compound may also be employed.

The following polyisocyanate compounds are exemplary suitable compounds for use in the invention: 4,4'-diphenylmethane diisocyanate; polycarbodiimide modified 4,4'-diphenylmethane diisocyanate; 2,4'-diphenylmethane diisocyanate; toluene-2,4-diisocyanate; toluene-2,6-diisocyanate; 3-phenyl-2-ethylenediisocyanate; 1,5-naphthalene diisocyanate; 1,8-naphthalene diisocyanate; cumene-2,4-diisocyanate; 4-methyoxy-1,3-phenylene diisocyanate; 4-chloro-1,3-phenylenediisocyanate; 4-bromo-1,3-phenylene diisocyanate; 4-ethyloxy-1,3-phenylenediisocyanate; 2,4'-diisocyanatodiphenyl ether; 5,6-dimethyl-1,3-phenylenediisocyanate; 2,4-dimethyl-1,3-phenylenediisocyanate; 4,4'-diisocyanatodiphenyl ether; benzidinediisocyanate; 4,6-dimethyl-1,3-phenylenediisocyanate; 9,10-anthracenediisocyanate; 4,4'-diisocyanatodibenzyl; 3,3,-dimethyl-4,4'-diisocyanatodiphenylmethane; 2,6-dimethyl-4,4'-diisocyanatodiphenyl; 2,4-diisocyanatostilbene; 3,3,-dimethyl-4,4'-diisocyanatodiphenyl; 3,3'-dimethoxy-4,4'-diisocyanatodiphenyl; 1,4-anthracenediisocyanate; 2,5-fluoroenediisocyanate; 1,3-phenylenediisocyanate; 1,4-phenylenediisocyanate; 2,6-diisocyanatobenzylfuran; bis(2-isocyanatoethyl)fumarate; bis(2-isocyanatoethyl)carbonate; bis(2-isocyanatoethyl)-4-cyclohexene-1,2-dicarboxylate; polymethylene polyphenyl isocyanate; 1,4-tetramethylenediisocyanate; 1,6-hexamethylenediisocyanate; 1,10-decamethylenediisocyanate; 1,3-cyclohexylenediisocyanate; 1,4-cyclohexylenediisocyanate; 4,4'-methylene-bis(cyclohexylisocyanate); m- and p-tetramethylxylene diisocyanate; 2,2,4-trimethyl-1,6-hexamethylene diisocyanate; m- and p-xylylene diisocyanate; 3-isocyanatomethyl-3,5,5-trimethylcyclohexyl isocyanate; phenylene bis(2-ethyl isocyanate); 4-methyl-1,3-cyclohexylene diisocyanate; 2-methyl-1,3-cyclohexylene diisocyanate; 2,4'-methylene bis(cyclohexylisocyanate); lower alkyl esters of 2,5-diisocyanatovaleric acid; and polyisocyanates containing three or more isocyanate groups per molecule such as triphenylmethane triisocyanate and 2,4-bis(4-isocyanatocyclohexylmethyl)cyclohexyl isocyanate.

Preferred compounds are the aromatic isocyanates (i.e., those in which the nitrogen atom of an isocyanate group is directly bonded to an aromatic ring structure) with the most preferred polyisocyanate compounds being various isomers of diphenylmethane diisocyanate, polycarbodiimide modified diphenylmethane diisocyanate, toluene diisocyanate, polymethylene polyphenyl isocyanates and triphenylmethane triisocyanate.

Polyols suitable for use in preparing a polyurethane base resin of the present invention include hydroxyl-containing polyesters, polyethers, polyamides, polycarbonates, polyesteramides, polythioethers, polyacetals, polyurethanes, polybutadienes or copolymers with acrylonitrile or styrene for example, castor oil and its derivatives and any monomeric polyols such as ethylene glycol, 1,2-propylene glycol, diethylene glycol, triethylene glycol, dipropylene glycol, trimethylene glycol, 1,3- and 1,4-butane diol; hexamethylene glycol, neopentyl glycol, glycerin, trimethylolpropane and pentaerythritol.

Polyester polyols can be used to provide a suitable balance in the prepolymer rigidity at room temperature and fluidity at moderately elevated temperatures such as from about 50° C. to about 70° C. Polyester polyols having a functionality of two are more preferred since such polyols form essentially linear oligomers when reacted with excess diisocyanate. The linearity of the prepolymer imparts thermoplasticity and stability to the base resin and the final products, particularly adhesive products. Saturated copolyester diols are most preferred because by using combinations of various types of such diols the final properties can be adjusted to those desired. Polyester polyols formed from one or more compounds which possess at least two hydroxyl groups such as polytetramethylene ether glycol, ethylene glycol, diethylene glycol, triethylene glycol, 1,2-propylene glycol, dipropylene glycol, trimethylene glycol, 1,3- and 1,4-butanediol, neopentyl glycol, hexamethylene glycol, decamethylene glycol, glycerin, trimethylolpropane, hexanetriol, pentaerythritol, and sorbitol, and one or more compounds which possess at least two carboxyl groups, such as malonic acid, maleic acid, succinic acid, adipic acid, tartaric acid, pimelic acid, sebacic acid, oxalic acid, glutaric acid, suberic acid, azelaic acid, dimerized fatty acids, isophthalic acid, phthalic acid, terephthalic acid, hexahydrophthalic acid, aconitic acid, trimellitic acid and hemimellitic acid can also be used.

Ring-opened polymers of cyclic esters such as polycaprolactone can also be used and the so called polymer polyol compositions such as polyether polyols and/or polyester polyols, and also polyols which can be obtained by polymerizing ethylenically unsaturated compounds, such as acrylonitrile, styrene, α-methylstyrene and methylmethacrylate in a polyether or polyester polyol are suitable. Also suitable are 1,2-polybutadiene glycol, 1,4-polybutadiene glycol, polyhydroxy polyacrylate, and epoxy resins and mixtures thereof.

An exemplary polyurethane resin is prepared by reacting a stoichiometric excess of a polyisocyanate with a combination of three different types of hydroxyl-terminated, linear, saturated copolyesters each having a molecular weight between 1000 and 6000 g/mol.

The first type (Type 1) of hydroxyl-terminated, linear, saturated copolyesters used to produce the polyurethane base resin of the invention is solid, amorphous copolyesters having glass transition temperatures above 0° C. and at least from about 80% to about 100% aromatic character. These copolyesters impart increased hardness and decreased elasticity to the polyurethane base resin.

The second type (Type 2) of hydroxyl-terminated, linear, saturated copolyesters used in producing the polyurethane base resin of the invention is liquid copolyesters having glass transition temperatures between about −10° C. and about −60° C. and having from about 40% to about 100% aliphatic character. These copolyesters impart increased open time, adhesion and elasticity and decreased flow point, cohesion and hardness to the polyurethane base resin.

The third type (Type 3) of hydroxyl-terminated, linear, saturated copolyesters used to produce the polyurethane base resin of the invention is solid, partially crystalline copolyesters having glass transition temperatures below 0° C. and having from about 40% to about 100% aliphatic character. These copolyesters impart increased cohesion and decreased melt viscosity and open time to the polyurethane base resin.

The term "linear saturated copolyesters" as used herein means that the copolyesters are prepared by polymerization of one or more dicarboxylic acids or the corresponding anhydrides thereof, including acids having an aromatic structure, such as phthalic acids, with diols such as ethylene glycol, propylene glycol, butylene glycol, hexylene glycol, diethylene glycol or neopentyl glycol. The term "linear saturated copolyesters" does not include unsaturated dicarboxylic acids such as maleic acid or fumaric acid.

The proportions, by relative equivalents (wherein the total equivalents of Types 1, 2, and 3 is 1.0), of the three copolyesters in the polyurethane base resin of the invention, are as follows: Type 1: from about 0 to about 1; Type 2: from about 0 to 1; and Type 3 from about 0 to 1. Preferably, the proportions are Type 1: from about 0 to 0.50; Type 2: from about 0 to about 0.50; and Type 3: from about 0.25 to about 0.75. Most preferably, the proportions are Type 1: about 0.25; Type 2: about 0.25; and Type 3: about 0.50.

Synthesis of both conventional polyurethane base resins, as well as the aforementioned copolyester-based polyurethane base resin can be carried out in glass reaction equipment under a dry nitrogen blanket or under a vacuum. The polyols are preheated to about 60° C. while mixing. The isocyanate is preheated to at least 50° C. in a closed container in an oven. Following combination of the reactants to form a prepolymer, and completion of any exotherm, with or without catalyst addition, the prepolymer is heated to about 80° C. until stabilization occurs. The term "stabilization" as used herein refers to the absence of further changes in appearance, such as color and clarity, viscosity and percent free isocyanate content over a period of from 15 to 30 minutes after the prepolymer reaches 80° C. During the reaction, the percent of free isocyanate gradually decreases until a final targeted range of about ±0.1% NCO is reached, where % NCO=42.02×100/equivalent weight of the prepolymer. The isocyanate content is determined by measuring by titration, such as by ASTM D2572 "Standard Test Method For Isocyanate Groups In Urethane Materials or Prepolymers".

The ratio of isocyanate group equivalents to hydroxyl group equivalents for the synthesis of the polyurethane base resin is from about 1.05:1.00 equivalents NCO/OH to about 10:1 equivalents NCO/OH, preferably from about 1.2:1.0 equivalents NCO/OH to about 3:1 equivalents NCO/OH, most preferably about 2:1 equivalents NCO/OH.

An organometallic catalyst such as an organotin or tertiary amine catalyst may also be present during the synthesis of the polyurethane base resin as is well known in the art. The catalyst is added in an amount of from about 0% to about 3% by weight of the resin, preferably from about 0.001% to about 1.5%, most preferably about 0.01%.

After completion of the synthesis reaction, the polyurethane base resin is typically degassed by vacuum, preferably greater than 29 in. Hg. The base resin can then be packaged in air tight containers blanketed with nitrogen for use in the processes of the invention or can be processed with modifying additives such as stabilizers, fillers, pigments, thixotropes, plasticizers, adhesion promoters, catalysts, reinforcements, antioxidants, flame retardants, crosslinking agents or solvents.

The moisture curable base of the present invention can also be a polysiloxane prepolymer with hydroxyl functionality that can be cured using silane-type crosslinking agents. This reaction is activated by the presence of water according to the following reaction sequence:

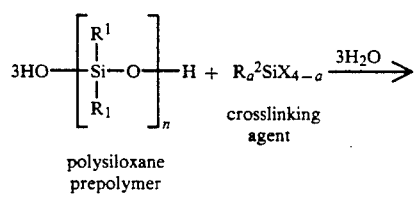
polysiloxane prepolymer

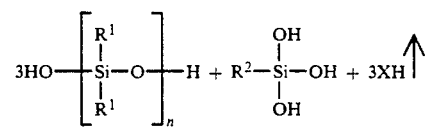

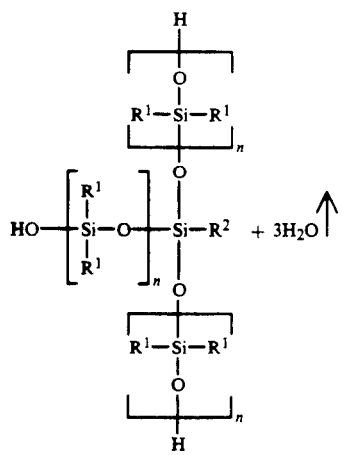

In the reaction, $R^1$ can be methyl, ethyl, phenyl, 3,3,3-trifluoropropyl and others and various combinations of these. $R^2$ can be methyl, ethyl, phenyl and others. X can be acyloxy, enoxy, oximo, alkoxy, amino and others. Additionally, a can be 0, 1 or 2 (with the reaction illustrating the instance wherein a=1) and when a=2, the material can sometimes be referred to as a chain extender.

The polysiloxane prepolymer can be prepared by conventional techniques, such as described in the Adhesive and Sealant Council, Inc. Caulks and Sealants Short Course, Dec. 1-4, 1986, pgs. 242-244. Such prepolymers have an average molecular weight of from about 400 to about 300,000. Typical polysiloxane prepolymers are described in "Silicon Compounds—Register and Review", Hüls Petrarch Systems, Bristol, Pa. and aforementioned U.S. Pat. Nos. 4,810,748, 4,870,130 and 4,978,706, the contents of all of the literature and patents being incorporated by reference.

The amount of crosslinking agent to polysiloxane prepolymer is typically from about 0.1 to about 14 parts by weight based on 100 parts by weight of polysiloxane prepolymer.

The moisture curable base can also be a polysulfide prepolymer having a plurality of mercaptan functionality that can be cured by certain peroxides in the presence of relatively basic materials such as water. The reaction sequence can involve the in situ reaction of a metal peroxide with water to yield hydrogen peroxide which reacts with mercaptan groups to form a disulfide linkage and water. The overall reaction can be shown as follows:

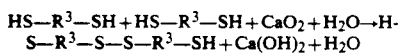

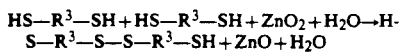

In the above reaction sequences, $R^3$ represents the remaining portion of the polysulfide prepolymer. Such prepolymers may be prepared by techniques as described in Kirk-Othmer Encyclopedia of Chemical Technology, Third Edition, Volume 18, p. 825. The prepolymers have an average molecular weight of from about 300 to about 8,000. Typical polysulfide prepolymers may be obtained from Morton Thiokol, Inc., Chicago, Ill. and are fully described in their brochure "LP Liquid Polysulfide Polymer". Additional illustrative polysulfide systems are described in aforementioned U.S. Pat. Nos. 3,659,896, 3,912,696 and 3,714,132, the contents of all of this information being incorporated by reference.

While calcium peroxide and zinc peroxide are preferred, additional compounds which can be used are lead peroxide, cadmium peroxide, magnesium peroxide, ammonium dichromate, potassium dichromate, sodium dichromate and others. The amount of peroxide or dichromate included in the composition is from about 2 to about 35 parts by weight based upon 100 parts by weight of polysulfide prepolymer.

A still further type of moisture curable system is the polymerization of alpha-cyanoacrylic acid esters (also known as 2-cyanoacrylic esters) which polymerize in the presence of basic materials such as water according to the following reaction sequence:

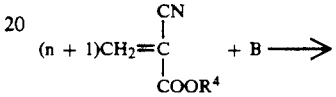

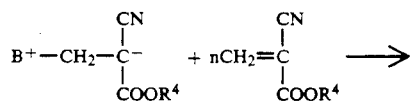

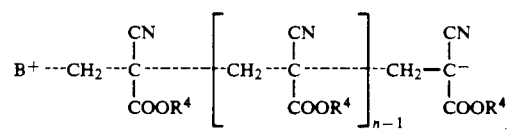

In the reaction sequence, B is a Lewis Base, such as water, $R^4$ represents an alkyl group, particularly an alkyl group containing from 1 to 4 carbon atoms, and n is an integer that can vary to over 100,000. Preferred alpha-cyano acrylic acid esters are methyl-2-cyanoacrylate, ethyl-2-cyanoacrylate, propyl-2-cyanoacrylate, isopropyl-2-cyanoacrylate, butyl-2-cyanoacrylate and isobutyl-2-cyanoacrylate. Such esters are commercially available from Eastman Kodak Co., Loctite Corp., Schering Industrial Chemicals, Henkel Corp., among others. Additional information concerning cyanoacrylic ester polymers may be found in the Kirk-Othmer Encyclopedia of Chemical Technology, Third Edition, Vol. I, p. 408-413, the contents of which are incorporated by reference.

Other moisture curable bases that are known to those of ordinary skill in the art can likewise be used in the present invention.

The curing agent which is used in the moisture curable composition of the present invention substantially does not contain molecular water, but produces water upon activation. More precisely, the curing agent substantially does not contain adsorbed water (e.g., on a zeolite) or water that is present as a hydrate of many known materials, such as calcium sulfate dihydrate or hemihydrate, iron sulfate heptahydrate, barium hydroxide octahydrate and sodium carbonate mono, hepta and decahydrate (i.e., the curing agents are non-hydrated). Instead, the curing agents of the present invention produce water upon activation. The curing agents of the present invention include compounds which decompose to form water. For instance, the curing agents can be metallic bicarbonates, such as alkali metal bicarbonates, particularly sodium bicarbonate and potassium bicarbonate, ammonium bicarbonate, ammonium carbonate; certain acids which produce water, such as boric acid; salts of organic acids, such as sodium stearate; certain polymers which produce water, such as, polyoxyethylene and polyethylene terephthalate; amides, such as polycaprolactam and polyhexamethylene adipamide; metal bisulfates, such as sodium bisulfate; phosphates, such as sodium biphosphate; phosphites, such as sodium biphosphite; carbohydrates, such as sugars, metal hydroxides, such as zinc hydroxide and magnesium hydroxide; and clays, such as hectorite and bentonite. Mixtures of the foregoing may also be used.

Another type of curing agent is a combination of two or more materials which can interact to form water. For example, the curing agent can be the combination of an acid and a base which will undergo a neutralization reaction to form water and a salt. Similarly, the curing agent can be a combination used to undergo a metathesis reaction, such as the reaction of zinc oxide and an acid to form water and a salt; an oxidation-reduction reaction, such as the reaction of hydrogen chloride with manganese oxide to form manganese chloride, water and chlorine gas; a condensation reaction, such as an aldol condensation reaction; or an addition reaction wherein oxygen and hydrogen are reacted under the influence of light and/or in the presence of a catalyst. In this last instance, the hydrogen and oxygen can be adsorbed onto a substance, such as activated carbon, and can be released by activation (e.g., by heat).

When the curing agent is a combination of two or more materials that can react under the conditions of storage or transportation, one or more of the materials is maintained out of contact of the other material(s). This can be achieved by dispersing the materials as discrete particles in the curable base so that reaction and subsequent curing can be attained by mixing the particle-containing base so that the particles can come into contact with each other. Alternatively, one or more of the materials can be encapsulated in the manner described below or the surface of particles of one or more of the materials can be deactivated (e.g., by chemical reaction) so that the curing agent will not produce water prematurely.

The curing agent is preferably a single material that produces water upon heating. As noted above, such materials include metallic bicarbonates and carbonates, water producing acids, salts of organic acids, water producing polymers and amides, metal bisulfates and bisulfites, metal phosphates and phosphites, carbohydrates, metal hydroxides and water producing clays. The most preferred curing agents are sodium bicarbonate, potassium bicarbonate, sodium dihydrogen phosphate, disodium hydrogen phosphite, ammonium dihydrogen phosphate, sodium bisulfite, sodium lauryl sulfate, sodium bitartrate, boric acid, and zinc hydroxide.

Although the amount of curing agent will vary depending upon the base substance selected and the amount of water produced by the curing agent, the curing agent will typically be present in an amount providing from about 50 to about 200%, preferably from about 75 to about 125% and most preferably from about 90 to about 110% of the water required to cause curing of the base substance.

As used in the present application, the phrase "substantially does not contain molecular water" is used to indicate that the curing agent may contain some incidental molecular water, but in an amount which is substantially less than that required in order to fully cure the base substance. For instance, the curing agent may contain a small amount of molecular water which constitutes less than about 20% of the total amount of water necessary to affect curing. Preferably, the curing agent contains less than about 5% of the water necessary for curing and most preferably, the curing agent contains less than 1% molecular water.

A variety of techniques may be used to activate the curing agent and the specific technique depends on the intended function of the composition. One manner of activating the curing agent is by the application of heat which can be directly applied by placing the composition in an oven or by applying a source of heat thereto, such as by using a hot air blower, or by bringing the composition into physical contact with a hot surface, or by subjecting the composition to microwave energy, induction heating, ultraviolet radiation, infrared radiation or mechanical mixing depending on the curing agent selected. Of course, the activation of the curing agent substantially must not adversely affect the curable base. For example, if activation of the curing agent occurs at a temperature that causes significant degradation of the curable base, then a different curing agent should be selected or a different means of activation should be used. In this latter regard, if the curing agent can be selectively heated (e.g., by microwave energy) without causing significant degradation of the curable base, then a suitable curable composition can be prepared.

The curing agent should also be selected to be substantially stable in the curable base until activation. For instance, a curing agent may not be adequately stable in a curable base which requires only a small amount of water for curing, but the same curing agent may be suitable for a different base. Similarly, the curing agent should be selected so that it is compatible with the curable base. For example, if the nature of the curing agent (e.g., its acidity) will substantially prevent curing, it may be desirable to use a different type of curing agent. However, in some situations, if the nature of the curing agent tends to inhibit curing, this characteristic might be used to advantage for those curable bases that tend to cure rapidly s as to extend the period for handling and applying the composition. The selection of appropriate curing agent can readily be determined by those of ordinary skill in the art based on the information provided herein.

As indicated above with respect to the description of polyurethanes, the compositions of the present invention may also contain a variety of conventional additives. For instance, the compositions can contain catalysts, solvents, plasticizers, pigments, dyes, fillers, thixotropes, reinforcing agents, antioxidants, stabilizers, lubricants, foaming agents, anticorrosives, antiskinning agents, adhesion promoters and flame retardants in amounts and using techniques well known to those of ordinary skill in the art.

The compositions of the present invention may be used in a wide variety of applications. More specifically, the compositions can be used as adhesives, molding materials, coatings, sealants or caulks.

The compositions of the present invention contain numerous advantages. Since the curing agents do not contain molecular water, the compositions exhibit improved stability and extended shelf life. Furthermore, by selecting the type and amount of curing agent, the production of water from the curing agent can be controlled so that curing can be achieved efficiently.

If it is desired to extend the shelf life of the composition further or inhibit reaction between components of the curing agent, particles of the curing agent or one or more components thereof, which are dispersed throughout the composition, can be provided with a coating that protects the curing agent from direct contact with the base before activation, but allows for the exposure of the curing agent, or the water produced by activation to the moisture curable substance. For instance, if the coating is meltable or frangible and the composition is subjected to heat or pressure in order to activate the composition, the coating would be selected so that the activating pressure or temperature would also degrade the coating.

Illustrative thermoplastic resins which can be used as a coating material include hydrocarbon plastics and elastomers such as polyethylenes, polypropylenes, polymers of $\alpha$-olefins such as 1-butene or 4-methylpentene-1, ionomers, chlorosulfonated polyethylenes, ethylene-propylene-diene terpolymers, natural rubber and other polyisoprenes, styrene-butadiene copolymers, acrylonitrile-butadiene copolymers, polybutadienes, polyisobutylenes, polychloroprenes, block copolymers of styrene-butadiene-styrene, styrene-isoprene-styrene and styrene-ethylene-butylene-styrene; carbon-chain polymers such as polystyrene, acrylonitrile-butadiene-styrene copolymers, polyacrylates, polymethacrylates, ethylene-acrylic acid copolymers, polyacrylonitriles, polyvinyl acetates, ethylene-vinylacetate copolymers, polyvinyl acetals, polyvinylbutyrals, polyvinyl chlorides, polyvinylidene chlorides, polytetrafluoroethylenes, polyhexafluoropropylenes, polychlorotrifluoroethylenes, polyvinylfluorides and polyvinylidene fluorides; heterochain thermoplastics such as polyamides, polyethyleneterephthalates, polyoxymethylenes, polycarbonates, polysulfides, polyphenylenesulfides, polysulfones, polyethersulfones, cellulosics, epoxies, polyesters, phenolics and polyurethanes; and high temperature polymers (including inorganic polymers) such as polyimides, polyphenyleneoxides, polyacetylenes and polydichlorophosphazenes. Additionally, various other surface treatment techniques may be employed such as by reacting the surface of the particles with a substance that then forms a protective coating, or by microencapsulation among other techniques.

The invention will be further clarified by the following Examples which are intended to be purely exemplary of the invention.

EXAMPLE 1

Curing of Polysiloxanes

A polysiloxane masterbatch was prepared as formulated below:

| Polysiloxane Masterbatch Formula: | |
|---|---|
| Items | % |
| 1) Polysiloxane Prepolymer (PS 345.5 from Hüls Petrarch Systems) | 92.94 |
| 2) Vinyltriacetoxy silane (Z-6075 from Dow Corning) | 7.00 |
| | 99.94 |
| 3) Dibutyltin diacetate catalyst (Dabco T-1 from Air Products) | 0.06 |
| | 100.00 |

The polysiloxane masterbatch was prepared in a 1000 ml reactor under a nitrogen blanket. Items 1 an 2 were charged to the reactor then mixed until homogeneous. While mixing items 1 and 2, item 3 was charged through an open port in the reactor lid. Once all three ingredients were completely charged and homogeneously mixed, the mixture was degassed. The degassed polysiloxane masterbatch was discharged into a 32 oz. high density polyethylene bottle. This polysiloxane masterbatch was then used to evaluate curing agents.

Using the polysiloxane masterbatch, compositions were prepared using different curing agents, the amounts of which were selected such that the amount of water produced would be theoretically equivalent.

| Items (wt. %) | Ex. 1 | Comp. Ex. 1 | Control Ex. 1 |
|---|---|---|---|
| 1) Polysiloxane masterbatch | 90.6 | 95.0 | 100.0 |
| 2) NaHCO$_3$ | 9.4 | 0.0 | 0.0 |
| 3) CaSO$_4$.2H$_2$O | 0.0 | 5.0 | 0.0 |
| | 100.0 | 100.0 | 100.0 |

These compositions were prepared by charging the polysiloxane masterbatch and the curing agent (if present) into a 400 ml Tri-pour beaker under a nitrogen blanket. These items were mixed by hand with a spatula until the mixture was homogeneous. The compounds were degassed and then transferred to a half-pint polypropylene jar.

One at a time a 10 g sample was taken from each composition and placed into an aluminum weighing dish. The sample in the aluminum dish was then immediately placed into a 160° C. oven for 10 minutes. At the end of the 10 minute heat cycle, observations were made and are set forth in Table 1.

TABLE 1

| | Observations | | |
|---|---|---|---|
| Cure Conditions Time @ Temperature | Example 1 | Comparative Example 1 | Control Example 1 |
| 10 min. @ 160° C. | cured | cured | uncured |

The results of this experiment show that both NaHCO$_3$ and CaSO$_4$.2H$_2$O, greatly accelerate the cure of silicones upon the application of heat. This is supported by the fact that the compositions containing these materials cured while the control remained uncured after heating.

EXAMPLE 2

Stability of Polysiloxanes Containing NaHCO$_3$ or CaSO$_4$.2H$_2$O

Using portions of the polysiloxane compositions prepared as set forth above, a stability study was conducted. Samples of the polysiloxane (with or without a curing agent) were charged to 4 dram bottles so as to fill the bottles half full and the bottles were then sealed under a nitrogen blanket. The bottles and their contents are set forth below:

| | Contents |
|---|---|
| Example 2 | Polysiloxane with NaHCO$_3$ |
| Comparative Example 2 | Polysiloxane with CaSO$_4$.2H$_2$O |
| Control Example 2 | Polysiloxane masterbatch only |

The samples were placed into an oven where the samples were exposed to mild heat cycles to perform an accelerated shelf life stability test. The results of this study are shown in Table 2.

TABLE 2

| Exposure Time @ Temperature | Observations | | |
|---|---|---|---|
| | Example 2 | Comparative Example 2 | Control Example 2 |
| 30 min. @ 50° C. | fluid | fluid | fluid |
| 30 min. @ 50° C. + 30 min. @ 60° C. | fluid | skinned, fluid below skin | fluid |
| 30 min. @ 50° C. + 100 min. @ 60° C. | fluid | skinned, fluid below skin | fluid |
| 30 min. @ 50° C. + 100 min. @ 60° C. + 90 min. @ 75° C. | fluid | cured to a rubbery solid | fluid |
| 30 min. @ 50° C. + 100 min. @ 60° C. + 135 min. @ 75° C. | fluid | cured to a rubbery solid | fluid |

The results of this experiment show that $NaHCO_3$ is much more stable than $CaSO_4.2H_2O$ in a polysiloxane composition. This conclusion is supported by the fact that the sample which contained $CaSO_4.2H_2O$ cured in the sealed bottle after being exposed to temperatures up to 75° C. while the sample that contained $NaHCO_3$ and the control remained fluid. Even after an additional 45 minutes of heating (last entry in Table 2), beyond the point where the sample containing $CaSO_4.2H_2O$ cured, the sample containing $NaHCO_3$ and the control sample remained fluid.

EXAMPLE 3

Quick Curing Polysiloxanes

Samples were prepared according to Example 1, Comparative Example 1 and Control Example 1. A 1 g portion of each sample was placed in the center of an aluminum weighing dish. Each dish was then placed into a 250° C. oven for 60 seconds. The samples were removed from the oven and observations were made. The sampling and oven curing procedures were repeated reducing the time in the oven at 10 second intervals. The results from this study are shown in Table 3.

TABLE 3

| Exposure Time @ 250° C. | Observations | | |
|---|---|---|---|
| | Example 3 (polysiloxane with $NaHCO_3$) | Comparative Example 3 (polysiloxane with $CaSO_4.2H_2O$) | Control Example 3 (polysiloxane masterbatch) |
| 10 seconds | uncured | uncured | uncured |
| 20 seconds | uncured | cured | uncured |
| 30 seconds | uncured | cured | uncured |
| 40 seconds | partial cure | cured | uncured |
| 50 seconds | partial cure | cured | uncured |
| 60 seconds | cured | cured | uncured |

Quick curing in under 60 seconds occurred with the samples containing the curing agents upon heating (250° C.). Although the sample containing $NaHCO_3$ cures at a slightly slower rate than the sample containing $CaSO_4.2H_2O$, it exhibits greater storage stability as was illustrated in Table 2.

Preparation of Polyester-Urethane Base Resin

Into a one liter resin reaction flask, 298.9 g of Dynacoll RP-360 (Hüls America), 144.6 g of Dynacoll RP-230 and 74.8 g of Dynacoll RP-110 were charged under a nitrogen blanket. The three copolyester diols were heated to 91° C. and mixed until homogenous and then allowed to cool to 73° C. 81.7 g of MDI (4,4'-diphenylmethane diisocyanate) were charged while mixing. As the reaction proceeded, an exotherm to 81° C. was observed. The resulting prepolymer was then degassed by applying a vacuum of 29.8 in. Hg. The product was then analyzed for isocyanate content. 2.05% NCO was obtained. The product was then discharged into half-pint containers and sealed under nitrogen.

A 30 g sample of the molten resin was poured into an aluminum weighing dish and allowed to cool and solidify and then demolded. Following exposure to atmospheric moisture, periodic hardness measurements were taken and the results are set forth in Table 4.

TABLE 4

| Days of R.T. Exposure | Shore D Hardness |
|---|---|
| 1 | 33 |
| 3 | 42 |
| 7 | 51 |
| 14 | 51 |

A sealed container of the prepolymer was stored at 70° C. for 19 days. With the exception of a moderate surface skin, the material remained stable (i.e. clear and fluid).

The Brookfield Thermosel viscosity was measured at 70° C. and was found to be 59,700 cP.

The open time was measured and was found to be 2 minutes. Open time is the period during which wet delamination occurs when pulling off a 1"×4" strip of Kraft paper at a 90° angle from a cooling 20 mil wet molten film of adhesive on cardboard. The film is prepared by heating an adhesive and a drawdown bar to 120° C. and then testing at 15 second intervals. The open time is the 15 second interval immediately before dry delamination or fiber tear occurs.

The base resin prepared in this procedure demonstrated good adhesion to plastics and metals (without further modification) when treated as an ambient moisture-cured polyurethane. Shear strengths were found to be as high as 1550 lbs./in.$^2$.

Preparation of Inert Thermoplastic Encapsulant

Using the same reaction equipment as in the preparation of the polyester-urethane base resin, 368.7 g of Empol 1010 (dimerized fatty acids from Quantum Chemicals, Emery Division) and 8.0 g of a 1% (by weight) solution of $H_3PO_4$ (85%, aq) in Empol 1010 were charged and mixed until homogeneous. 15.0 g of Sebacic Acid, CP Grade (Union Camp) and 408.2 g of Armeen 18D (octadecylamine from Akzo Chemie America, Armak Chemicals Division), were charged, mixed and heated gradually to 241° C. The temperature was maintained above 230° C. for approximately two hours, the final hour of which a vacuum of 29.6 in. Hg was applied to degas the polyamide resin and remove trace amounts of water. The molten resin was discharged into a release paper lined box and cooled under nitrogen in a desiccator and stored for future use as an encapsulant for curing agents.

Test Results

Acid Value (mg KOH/g) = 1.1
Amine Value (mg KOH/g) = 1.7
Shore D Hardness = 41
Ring and Ball Softening Point (° C.) = 100° C.
Brookfield Thermosel Viscosity (cP) = 525 at 100° C.

Encapsulation of CaSO$_4$.½H$_2$O

Using the same reaction/blending apparatus as in the preparation of the thermoplastic encapsulant, 250.0 g of the inert polyamide encapsulant were charged after breaking the solid resin into medium sized chips. Heat was applied and at the onset of melting, mixing was commenced. Once completely molten and T=122° C., 250.0 g of CaSO$_4$.½H$_2$O were charged while mixing. When homogeneous, a vacuum of 29.0 in. Hg at T=110° C. was applied to degas the product. The product was discharged into a release paper lined box and cooled under a nitrogen blanket in a desiccator. Once completely cooled, the solid product was broken into medium sized chips and milled to a powder (with the aid of liquid nitrogen chilling) using a Brinkmann Centrifugal Mill. The curative was then passed through a 250µ screen to remove the coarse particles. The powdered, encapsulated curative was stored in a sealable container under nitrogen for future incorporation with a polyurethane base resin.

Test Results

Shore D hardness=48
Ring and Ball Softening Point (° C.)=103
Brookfield Thermosel Viscosity (cP)=960 at 110° C.

Encapsulation of NaHCO$_3$

In the same manner as was previously described, NaHCO$_3$ was encapsulated and milled and stored for future incorporation with a polyurethane base resin.

Test Results

Shore D Hardness=40
Ring and Ball Softening Point (° C.)=103
Brookfield Thermosel Viscosity (cP)=998 at 110° C.

COMPARATIVE EXAMPLE 4

Preparation of Polyester-Urethane/Encapsulated CaSO$_4$.½H$_2$O Composite Adhesive System A polyester-urethane base resin was synthesized in a manner similar to that described above by reacting a blend of 345.8 g of RP-360, 167.4 g of RP-230 and 86.5 g of RP-110 with 94.6 g of MDI to a % NCO of 1.8. 8.0 g of L-5340 (polyoxyalkylene-siloxane surfactant from Union Carbide) were added, mixed and degassed under a vacuum of 29.3 in. Hg. With the molten degassed prepolymer at a temperature of 76° C., 97.8 g of the milled encapsulated CaSO$_4$.½H$_2$O curing agent were gradually charged while mixing. When the addition was completed a temperature of 78° C. was observed. The homogeneous dispersion was degassed under a vacuum of 29.5 in. Hg and discharged into halfpint containers under nitrogen.

Test Results:

| Brookfield Thermosel Viscosity (cP) | = 193,000 at 70° C. |
|---|---|
| | 63,250 at 100° C. |
| | 52,250 at 130° C. |
| | 18,500 at 160° C. |
| | 14,850 at 180° C. |

Noticeable foaming took place at ≧160° C. during the viscosity measurements. This indicates the curing reaction is taking place despite a viscosity decrease.

Cure/Foam Test—upon holding at elevated temperature, 10 min. at 160° C., a 10 g sample underwent a volume expansion of 400%.

EXAMPLE 4

Preparation of Polyester-Urethane/Encapsulated NaHCO$_3$ Composite Adhesive System In the same manner as in Comparative Example 4, a polyester-urethane based adhesive product was prepared with L-5340 except that the encapsulated NaHCO$_3$ as describe above was incorporated. The following quantities were employed: 379.1 g of RP-360, 183.4 g of RP-230, 94.8 g of RP-110, 103.7 g of MDI, 8.0 g of L-5340 and 31.0 g of the previously described encapsulated NaHCO$_3$.

Test Results

| Brookfield Thermosel Viscosity (cP) | = 109,000 at 70° C. |
|---|---|
| | 75,750 at 100° C. |
| | 31,000 at 130° C. |
| | 5,538 at 160° C. |
| | 7,775 after 3 min. at 160° C. |

Noticeable foaming took place at ≧150° C. during the viscosity measurements. This indicates the curing reaction is taking place.

Cure/Foam Test—upon holding at elevated temperature, 10 min. at 160° C., a 10 g sample underwent a volume expansion of 400%.

COMPARATIVE EXAMPLE 5 AND EXAMPLE 5

Preparation of Polyester-Urethane/CaSO$_4$.½H$_2$O and Polyester-Urethane/NaHCO$_3$ Composite Adhesive Systems In the same manner as in Comparative Example 4 and Example 4, two different polyester-urethane based adhesive products were prepared except that the CaSO$_4$.½H$_2$O (Comparative Example 5) and NaHCO$_3$ (Example 5) curatives were incorporated respectively, without encapsulation.

TABLE 5

| | Test Results, Sealed Container Stability at 70° C. | | | |
|---|---|---|---|---|
| Time | Comparative Example 4 | Comparative Example 5 | Example 4 | Example 5 |
| 3 hours | Slightly viscous, slightly gassy, no pressure | Very viscous, very gassy, pressure build-up | Very fluid, not discolored | Viscous, discolored |
| 8 hours | Viscous, gassy, no pressure | — | Very fluid, not discolored | — |

Note:
Observations were made at 70° C.

It will be noted that Examples 4 and 5 which contain NaHCO$_3$ are generally more stable when compared to Comparative Examples 4 and 5, respectively. It will also be understood that encapsulation of the curatives resulted in greatly improved molten potlife.

Preparation of Polyether Urethane Base Resin

Into a four liter resin reaction flask, 1228.8 g of Voranol 220-056 (polyoxyalkylene diol, Dow Chemical Company, Midland, Mich.) and 673.5 g of Voranol 232-034 (polyoxyalkylene triol, Dow Chemical Company, Midland, Mich.) were charged. The polyols were mixed (using an electric mixer and a three impeller shaft) and heated (using a heating mantle) to 60° C. Then 347.4 g of molten (50° C.) Isonate 2125M (4,4'-diphenylmethane diisocyanate, Dow Chemical Company, Midland, Mich.) were added and the contents of the reactor were mixed without heating for six minutes, after which the temperature was 59° C. Next, 11 drops (0.31 g) of Dabco T-9 (stannous type organometallic catalyst, Air Products and Chemicals, Inc., Allentown, Pa.) were added. Two minutes later an exotherm to 90° C. was observed. After three additional minutes (at T=86° C.), 750.0 g of PX-316 (mixed n-alkylphthalate, Aristech) were added gradually over a four minute period, after which the temperature had dropped to 69° C. A vacuum was gradually applied over a 23 minute period. Full vacuum (greater than 29 in. Hg) was then maintained for 10 minutes. The resulting plasticized urethane prepolymer was then discharged into airtight high density polyethylene jars of 32 fluid ounce capacity for storage and later use.

Test Results

% NCO = 1.43
Brookfield Viscosity (cP)=20,950 (Model RV, Spindle #6/20 rpm/23° C.)

| Stability of Curing Agents in Polyether Urethane | |
|---|---|
| Curative | Theoretical % by Weight Water From Decomposition |
| Blank | 0 |
| H$_3$BO$_3$ | 43.6 |
| CuSO$_4$.5H$_2$O | 36.0 |

The amount of H$_3$BO$_3$ was 2.0 g/100 g of the polyether urethane base resin described above which theoretically provides 0.87 gram of water per 100 grams of the resin. The amount of CuSO$_4$.5H$_2$O was 2.47 g/100 g of resin which also theoretically provided 0.87 gram of water per 100 grams of the resin.

The noted amount of curing agent was hand stirred into the 150 grams of the polyether urethane base resin at room temperature using a stainless steel spatula. A portion of each sample was placed in two separate sets of ½ pint paint cans. One set of cans were heated to 80° C. in a forced air oven with the results being as follows:

| | 80° C. 1 Hr. |
|---|---|
| Blank | o.k. |
| H$_3$BO$_3$ | cured |
| CuSO$_4$.5H$_2$O | cured |

The foregoing results indicate that both H$_3$BO$_3$ and CuSO$_4$.5H$_2$O will provide sufficient water for curing upon being exposed to elevated temperature. To determine the relative stability of the curing agents, the second set of cans were maintained at room temperature and were checked periodically over a period of 17 days. The results of Example 6 (using H$_3$BO$_3$), Comparative Example 6 (using CuSO$_4$.5H$_2$O) and the control are provided in Table 6.

TABLE 6

| Example | | 1 Day | 2 Days | 6 Days | 9 Days | 12 Days | 16 Days | 17 Days |
|---|---|---|---|---|---|---|---|---|
| Ex. 6 | H$_3$BO$_3$ | o.k. | o.k. | o.k. | o.k. | Thickened | Thickened Rubbery | Thickened Rubbery |
| Comp. Ex. 6 | CuSO$_4$.5H$_2$O | o.k. | o.k. | Thickened | Thickened Rubbery | Cured Rubbery | — | — |
| Control | Blank | o.k. | o.k. | o.k. | o.k. | o.k. | o.k. Skinned | o.k. Skinned | o.k. = Substantial curing had not occurred.

The results of this experiment illustrate that two substances used in quantities to supply the same amount of water when activated do not have the same relative stability; the boric acid (which contains no molecular water) is more stable than a hydrated material, CuSO$_4$.5H$_2$O.

Stability of Additional Curing Agents

To determine the stability of various curing agents, a test was developed based on the stability of the curing agents in the presence of reactive free isocyanate groups.

Testing was done using a 40 weight percent solution of 4,4'-diphenyl methane diisocyanate (MDI) in dry toluene. The toluene MDI solution (35 g) were charged to 2 oz. eye dropper bottles and the water generating curative was added to the eyedropper bottle. In most cases, a 1:1 molar addition of curing agent MDI was made. In some cases less than a 1:1 molar ratio was used because of (1) high molecular weight of the curing agent requiring a large sample weight or (2) limited amount of curing agent available. Then the % NCO was measured on each sample over a given period of time. All samples were stored in a desiccator at room temperature. Samples were filtered using a syringe and 0.45 micron filter disc to remove the curing agent from the solution during the NCO titration.

Titration for % NCO (Procedure for Determination of Isocyanate Content)

1) Into a dry, nitrogen-purged 250 ml Erlenmeyer flask, weigh the sample. Be careful to avoid getting any sample on the neck or upper sidewall of the flask. Add a spinbar, purge with nitrogen and cap. Use 3 to 4 g of filtered sample.

2) Accurately dispense 40.0 ml of 0.5N dibutylamine in toluene solution on top of sample. Cap and spin until sample is completely incorporated. Use mild heating only if absolutely necessary.

3) Add ~50 to 75 ml of indicator solution (bromophenol blue in IPA) and mix.

4) Titrate with 1N HCl until a greenish-yellow endpoint is reached. If mixture becomes cloudy during titration, add some IPA with a wash bottle.

5) Calculation:

$$\% \text{ NCO} = \frac{[\text{Blank (ml)} - \text{Titre (ml)}] \times 4.202}{\text{wt. (g)}}$$

The blank and the titre are volumes of HCl required to bring the respective blank and sample-containing solutions to an endpoint.

The blank is determined using the above described process without any sample.

The results of the stability tests are provided in Table 7 wherein the first 12 samples are non-hydrated compounds representing Examples 7–18 and wherein pure 40% MDI is the control and the hydrated salts are Comparative Examples 7–9.

TABLE 7

| Curing Agent | 1 Day | | 3 Days | | 4 Days | | 5 Days | | 7 Days | |
|---|---|---|---|---|---|---|---|---|---|---|
| | % NCO | % NCO/Blank | % NCO | % NCO/Blank | % NCO | % NCO/Blank | % NCO | % NCO/Blank | % NCO | % NCO/Blank |
| $NH_4HCO_3$ | 12.83 | .957 | | | | | 12.02 | .905 | | |
| $NaH_2PO_4$ | 13.30 | .933 | | | | | 13.14 | .989 | | |
| $Na_2HPO_4$ | 13.27 | .990 | | | | | 12.98 | .977 | | |
| $Zn(OH)_2$ | 13.29 | .992 | | | | | 12.87 | .969 | | |
| $Na_2HPO_3$* | 13.22 | .987 | | | | | 13.06 | .983 | | |
| $H_5BO_2$ | 13.26 | .990 | | | | | 13.40 | 1.009 | | |
| $NaHSO_3$ | 13.21 | .986 | | | | | 13.34 | 1.005 | | |
| $NH_4H_2PO_4$ | 13.25 | .989 | | | | | 13.35 | 1.005 | | |
| $KHCO_3$ | 13.20 | .985 | | | | | 13.58 | 1.023 | | |
| Na Lauryl $SO_4$ | 13.33 | .995 | | | | | 13.33 | 1.004 | | |
| $NH_4$ Stearate | 12.72 | .949 | | | | | 12.99 | .978 | | |
| NaH Tartrate | 13.27 | .990 | | | | | 13.51 | 1.017 | | |
| Pure 40% MDI | 13.40 | 1.000 | 13.64 | 1.000 | 13.28 | 1.000 | 13.28 | 1.000 | 13.65 | 1.000 |
| $Al_2(SO_4)$ $18H_2O$ | | | | | 12.92 | .973 | | | 12.83 | .940 |
| $FeSO_4$ $7H_2O$ | | | 13.17 | .965 | | | | | | |
| $MgSO_4$ $7H_2O$ | | | 13.31 | .975 | | | | | | |

| Curing Agent | 8 Days | | 36 Days | | 44 Days | | 48 Days | | 49 Day | |
|---|---|---|---|---|---|---|---|---|---|---|
| | % NCO | % NCO/Blank | % NCO | % NCO/Blank | % NCO | % NCO/Blank | % NCO | % NCO/Blank | % NCO | % NCO/Blank |
| $NH_4HCO_3$ | 11.97 | .877 | | | | | | | 11.54 | .802 |
| $NaH_2PO_4$ | 13.45 | .985 | | | | | | | 12.90 | .987 |
| $Na_2HPO_4$ | 12.77 | .936 | | | | | | | Solidified | |
| $Zn(OH)_2$ | 12.92 | .947 | | | | | | | 13.04 | .907 |
| $Na_2HPO_3$* | 13.30 | .974 | | | | | | | 14.09 | .980 |
| $H_5BO_2$ | 13.68 | 1.002 | 14.01 | .995 | | | | | 13.98 | .972 |
| $NaHSO_3$ | 13.62 | .998 | 13.73 | .975 | | | | | 14.14 | .983 |
| $NH_4H_2PO_4$ | 13.23 | .969 | 14.37 | 1.021 | | | | | 14.53 | 1.010 |
| $KHCO_3$ | 13.59 | .996 | 13.93 | .989 | | | | | 15.29 | 1.063 |
| Na Lauryl $SO_4$ | 13.80 | 1.011 | | | | | | | 13.72 | .954 |
| $NH_4$ Stearate | Solidified | | | | | | | | Solidified | |
| NaH Tartrate | 13.76 | 1.008 | | | | | | | 14.32 | .996 |
| Pure 40% MDI | 13.65 | 1.000 | 14.06 | 1.000 | 14.38 | 1.000 | 14.38 | 1.000 | 14.38 | 1.000 |
| $Al_2(SO_4)$ $18H_2O$ | | | Solidified | | | | 12.85 | .893* | | |
| $FeSO_4$ $7H_2O$ | | | Solidified | | 10.98 | .763** | | | | |
| $MgSO_4$ $7H_2O$ | | | Solidified | | 12.38 | .861** | | | | |

*Material is deliquescent.
**These samples required a special filtration procedure to separate the liquid phase of the sample from the solid phase.

The MDI/toluene stability test clearly shows that materials that are reactive with MDI will either solidify the solution or cause the MDI content to drop below 90% of the activity, in 36 days, of the pure MDI/toluene solution.

Curing of Cyanoacrylic Acid Ester Base

The cyanoacrylic acid ester base used in this experiment was Super Bonder 414 manufactured by Loctite Corp. and the curing agents and amounts added thereto are provided in Table 8.

TABLE 8

| Curing Agent | Charge Grams Water per 100 g base | Grams of Base | Grams Curing Agent |
|---|---|---|---|
| Blank (Control) | — | 8.16 | — |
| $H_3BO_3$ (43.6% water) | 1.0 | 8.09 | 0.19 |
| $H_3BO_3$ (43.6% water) | 5.0 | 8.24 | 0.93 |
| $KHCO_3$ (8.9% water) | 5.0 | 7.67 | 4.30 |
| $NaH_2PO_4$ (7.5% water) | 5.0 | 7.28 | 5.77 |

Values in ( ) indicate theoretical % water formed via thermal decomposition.

The cyanoacrylic acid ester base was weighed into aluminum weighing dishes and the curing agent (which had been milled in a centrifugal mill using a 0.5 mm screen) was added and mixed in using a glass rod. The $KHCO_3$ and $NaH_2PO_4$ cured almost instantly as they were mixed in. The remaining samples were heated on a hot plate to 125° C. under a dry $N_2$ blanket for 10 minutes. The samples were removed from the hot plate and allowed to cool before pouring a small bead (~½"

dia.) on four different substrates (steel, polystyrene plastic, cardboard and plain white paper). Observations, both visually and by touching with a glass stirring rod, were made on each sample to determine if the cyanoacrylic acid ester base will cure at an accelerated rate if it contains a curing agent that has been heated to liberate water. The observations revealed that the test results were independent of the substrate and the results provided in Table 9 are indicative of the four substrates.

TABLE 9

| Curing Agent | Charge Grams Water per 100 g Base | 1 Hr. | 2 Hrs. | 3 Hrs. | 4 Hrs. |
|---|---|---|---|---|---|
| Blank | — | o.k. | o.k. | Skin formed, stringy | Very tacky (edge) stringy center |
| $H_3BO_3$ | 1.0 | o.k. | o.k. | Skin formed, stringy | Tacky, no strings |
| $H_3BO_3$ | 5.0 | o.k. | o.k. | Skin formed, stringy | Not tacky, dry surface | o.k. = substantial curing had not occured.

The above observations were made by touching a glass rod to the surface of the ½" bead. The results of the 4 hour test demonstrated that the sample containing 5 g water/100 g cyanoacrylic acid ester base cured to a greater extent than the sample containing 1 g water/100 g cyanoacrylic acid ester base and that the 1 g water/100 g cyanoacrylic acid ester based had cured to a greater extent than the blank. It is of significance to note that the cyanoacrylic acid ester base cured even in the presence of an acidic compound.

Curing of Polysulfide Resin Base

The polysulfide resin used in this experiment was LP-32C manufactured by Morton International Specialty Chemical Group. This resin was mixed with 20% $CaO_2$ (from FMC Corporation) using a Cowles dispersator. This resin-base system was then mixed with illustrative curing agents of the present invention as described in Table 10.

TABLE 10

| | Grams Water per 100 g Resin | Grams Resin Plus $CaO_2$ | Grams Curing Agent |
|---|---|---|---|
| Blank (Control) | 0 | 17.87 | 0 |
| $H_3BO_3$ (43.6% water) | 1.0 | 28.29 | 0.65 |
| $Na_2HPO_3$ (7.1% water) | 1.0 | 27.41 | 3.86 |

Values in ( ) are theoretical % water formed on thermal decomposition.

The polysulfide/$CaO_2$ sample was weighed into an aluminum dish and the curing agent mixed into the system using a glass rod for each of $H_3BO_3$ and $Na_2HPO_3$. The three samples were heated on a hot plate to 170° C. When the samples reached 150° C. it was noted that the two samples containing the water producing curing agent began to bubble and swell. The samples were held at 170° C. for 10 minutes then cooled to room temperature. The samples were stored in a desiccator for three days after which no apparent change was noted that any of the three samples were curing. At that point the samples were removed from the desiccator and exposed to ambient room conditions. After four days at ambient room conditions the following observations were made on the three samples.

1) Blank—Surface was tacky; when touched with a glass rod a thick short string was pulled up with the glass rod. Small areas around the edge of the aluminum weighing dish were dry to the touch. Very limited curing had occurred.

2) $H_3BO_3$—The surface was tacky and rod a thick short string was pulled up with the glass rod. As with the blank, the pulled up surface of the resin slowly recoiled and after ~2 minutes the surface leveled again. No curing had occurred with the $H_3BO_3$ sample.

3) $Na_2HPO_3$—The surface was not tacky when touched with a glass rod. No material was pulled up with the glass rod on any part of the sample's surface. The polysulfide resin had cured on the surface of the sample.

From the foregoing observations, it was concluded that thermal decomposition of the $Na_2HPO_3$ contained in the polysulfide resin caused the polysulfide resin to cure whereas the presence of acidic $H_3BO_3$ or a resin containing no additive did not cure.

Curing of Polyester Urethane Base With Encapsulated Curing Agent

A. Procedure for Encapsulating Curing Agents

1. Melt encapsulating material at 110°-120° C.
2. Mix in curing agent using a Cowles dispersator under a nitrogen blanket. Cool to room temperature.
3. Brinkmann mill the encapsulated curative "as is" (liquid nitrogen not necessary) and sieve to ~80 mesh.
4. The ~80 mesh curing agent is mixed with a polyurethane resin by melting the resin at 80°-90° C. under a nitrogen blanket and using a Cowles dispersator to add the curative.
5. Test to determine temperature of activation and stability at a fixed temperature.

The inert thermoplastic prepared from Empol 1010, sebacic acid and Armeen 18D used in Example 4 was used as the encapsulant for selected curing agents. The curing agents were encapsulated by melting 300 g of the inert thermoplastic at 110°-120° C. in a 1.2 liter stainless steel beaker under a dry nitrogen blanket. Then 100 g of the curing agent was mixed into the thermoplastic encapsulant using a Cowles dispersator. Each curing agent was first milled in a centrifugal mill using a 0.5mm screen before the addition. Mixing was continued until a uniform blend was obtained at which time the blend was cooled and allowed to solidify. The solid material was broken into pieces that were small enough to feed into a centrifugal mill and milled without using a screen. The milled material was sieved to obtain the ~80 mesh fraction.

B. Incorporating Curing Agents and Encapsulated Curing Agents Polyester Urethane Base Approximately 500 g of a polyester urethane base prepared from Dynacoll RP-360, RP-230, RP-110 and MDI used in Example 4 was charged to a 1 quart tared paint can. The polyester-urethane base was then melted at 80°-90° C. under a dry nitrogen blanket. Then each curing agent or encapsulated curing agent was added in sufficient quantity to supply 0.75 g water/100 g resin to the system, this value represented 1.5 times the water needed to comply with the theoretical equivalent. A Cowles dispersator was used to blend the two components together before dispensing the material into ¼ pint paint cans, which were sealed under nitrogen for subsequent testing. The results of the encapsulating step are set forth in Table 11.

Influence of Time on Stability at 145° C. for

TABLE 11

| Curing Agent | Encapsulated Yes/No | Weight Ratio Encapsulant: Curing Agent | Grams Additive/Grams Resin |
|---|---|---|---|
| 1) $H_3BO_3$ | No | Curing Agent Not Encapsulated | Actual 0.2 g $H_3BO_3$/g Resin<br>Target 0.2 g $H_3BO_3$/g Resin |
| 2) $KHCO_3$ | No | Curing Agent Not Encapsulated | Actual 0.84 g $KHCO_3$/g Resin<br>Target 0.84 g $KHCO_3$/g Resin |
| 3) $NaHSO_3$ | Yes | 3:1 | Actual 0.35 g Encapsulated Agent/g Resin<br>Target 0.35 g Encapsulated Agent/g Resin |
| 4) $NaH_2PO_4$ | Yes | 3:1 | Actual 0.35 g Encapsulated Agent/g Resin*<br>Target 0.43 g Encapsulated Agent/g Resin |
| 5) $NH_4H_2PO_4$ | Yes | 3:1 | Actual 0.19 g Encapsulated Agent/g Resin<br>Target 0.19 g Encapsulated Agent/g Resin |

*Only 0.35 g encapsulated curing agent/g resin could be incorporated because the resin became too thick to handle at higher solids.

Influence of Temperature on Curing of Polyester-Urethane Base Containing Encapsulated Curing Agents The ½ pint cans containing resin and encapsulated curing agents were placed in an oven which was initially set at 80° C. A ½ pint can containing soya oil of approximately the same volume of resin and a thermometer were used to measure the actual temperature of the sample. Equilibration times were 20 minutes at each temperature. At the end of each 30 minute period the cans were removed from the oven, opened and the samples observed visually and by probing with a glass stirring rod. The results are set forth in Table 12.

Polyester-Urethane Base Containing Encapsulated Curing Agents

Another set of the ½ pint paint cans containing the polyester urethane base and encapsulated curing agents were placed in an oven at 145° C., the oven being in an exhaust hood. Each sample was examined every hour, visually and by glass rod probing, to determine if the resin had cured. The results are set forth in Table 13.

TABLE 13

| Sample | 1 Hr. | 2 Hrs. | 3 Hrs. | 4 Hrs. | 5 Hrs. | 6 Hrs. | Overnight |
|---|---|---|---|---|---|---|---|
| $NaH_2PO_4$ | Slightly Swelled | Swelled | Swelled | Swelled | Swelled | Swelled | Cured |
| $NH_4H_2PO_4$ | Slightly Swelled | Swelled | Swelled | Swelled | Rubbery | Cured | |
| Control | o.k. | o.k. | o.k. | o.k. | o.k. | o.k. | o.k. | o.k. = substantial curing had not occurred.

Influence of Time on Stability at 80° C. for Polyester-Urethane Base Containing Encapsulated Curing Agents Another set of ½ pint cans containing the polyester urethane base and encapsulated curing agents were

TABLE 12

| Actual T °C. (soya oil) | 78 | 97 | 110 | 125 | 140 | 159 | 174* | 195 |
|---|---|---|---|---|---|---|---|---|
| Set T °C. | 80 | 100 | 112 | 125 | 142 | 157 | 173 | 196 |
| $H_3BO_3$ | Soft Solid | Gel Rubbery | Cured | | | | | |
| $KHCO_3$ | Soft Solid | Gel Rubbery | Cured | | | | | |
| $NaHSO_3$ | Soft Solid | o.k. Skin | o.k. | o.k. | o.k. | Swelled | Very Soft Collapsed | Soft |
| $NaH_2PO_4$ | Soft Solid | o.k. Skin | o.k. | o.k. | o.k. | Swelled | Swelled | Cured |
| $NH_4H_2PO_4$ | Soft Solid | o.k. Skin | o.k. | o.k. | o.k. | Swelled | Swelled | Cured |
| Control | Clear Very Soft | o.k. Skin | o.k. | o.k. | o.k. | o.k. | o.k. | | o.k. = substantial curing had not occurred.
*Duplicates checked at this temperature with agreement with initial results.

The results of this study show that the temperature at which a polyester-urethane base can be cured can be controlled by the choice of curing agent.

placed in an oven at 80° C. then examined at the times shown in the table. Examination was carried out visually and by touching and probing the samples with a glass rod. The results are set forth in Table 14.

TABLE 14

| Sample | 1 Hr. | 2 Hrs. | 4 Hrs. | 5 Hrs. | 1 Day | 2 Days | 3 Days | 7 Days |
|---|---|---|---|---|---|---|---|---|
| $H_3BO_3$ | Rubbery | Swelled Rubbery | Cured | — | — | | | |
| $KHCO_3$ | o.k. | Rubbery | Cured | — | — | | | |
| $NaH_2PO_4$ | o.k. | o.k. | o.k. | o.k. | o.k. | Rubbery | Rubbery | Cured |
| $NH_4H_2PO_4$ | o.k. | o.k. | o.k. | o.k. | o.k. | o.k. | o.k. | Cured |
| Control | o.k. | o.k. | o.k. | o.k. | o.k. | o.k. | o.k. | o.k. | o.k. = substantial curing had not occurred.

Comparison of the time needed to cure for base resins with and without curing agents indicates that substantial variance in cure rate, 145° C. for the results in Table 13 and 80° C. for results in Table 14) is possible by selecting curing agents that do not contain water.

Other embodiments of the invention will be apparent to those skilled in the art from consideration of the specification and practice of the invention disclosed herein. It is intended that the specification and examples be considered as exemplary only, with a true scope and spirit of the invention being indicated by the following claims.

What is claimed:

1. A moisture curable composition that is curable independent of ambient moisture conditions comprising a moisture curable reactant requiring an amount of water for curing and a curing agent wherein said curing agent substantially does not contain molecular water including water of hydration, but produces water upon activation so as to provide from about 50 to about 20% of the amount of the water required for curing said moisture curable reactant.

2. The moisture curable composition of claim 1 wherein the curing agent is a single component or a mixture thereof which individually produce water upon activation.

3. The moisture curable composition of claim 2 wherein the curing agent is selected from the group of water producing materials consisting of metal bicarbonates, metal carbonates, acids, bases, salts of organic acids, ammonium salts, polymers, amides, metal bisulfates, metal bisulfites, metal phosphates, metal phosphites, carbohydrates, metal hydroxides, clays and mixtures thereof.

4. The moisture curable composition of claim 3 wherein the curing agent is selected from the group of water producing materials consisting of metal bicarbonates, metal carbonates, acids, salts of organic acids, metal bisulfates, metal bisulfites, metal phosphates, metal phosphites, and mixtures thereof.

5. The moisture curable composition of claim 1 wherein the curing agent is comprised of at least two materials which react to form water.

6. The moisture curable composition of claim 1 wherein the curing agent is in the form of particles that are dispersed in the moisture curable base.

7. The moisture curable composition of claim 1 wherein the curing agent is encapsulated.

8. The moisture curable composition of claim 7 wherein the curing agent is activated by heat and is encapsulated in a thermoplastic material that melts at a temperature not higher than the activation temperature of the curing agent.

9. The moisture curable composition of claim 7 wherein the curing agent is activated by mixing and is encapsulated in a material that is frangible under the mixing conditions.

10. The moisture curable composition of claim 1 wherein the curing agent is surface treated.

11. The moisture curable composition of claim 1 wherein the curing agent is present in an amount to provide from about 50 to about 200% of the water required to cause curing of the moisture curable base.

12. The moisture curable composition of claim 1 wherein the curing agent is present in an amount to provide from about 75 to about 125% of the water required to cause curing of the moisture curable base.

13. The moisture curable composition of claim 1 wherein the moisture curable base is selected from the group consisting of polyurethanes, polysiloxanes, polysulfides, and cyanoacrylic acid esters.

14. The moisture curable composition of claim 13 wherein the moisture curable base comprises a polyurethane.

15. The moisture curable composition of claim 13 wherein the moisture curable base comprises a polysiloxane and said composition further comprises a silane crosslinking agent.

16. The moisture curable composition of claim 13 wherein the moisture curable base comprises a polysulfide and said composition further comprises a peroxide compound or dichromate compound.

17. The moisture curable composition of claim 13 wherein the moisture curable base comprises an alpha-cyanoacrylic acid ester.

18. The moisture curable composition of claim 1 wherein the composition contains at least one of the group selected from stabilizers, antioxidants, adhesion promoters, fillers, pigments, dyes, reinforcing agents, thixotropes, plasticizers, solvents, catalysts, lubricants, foaming agents, flame retardants, anticorrosives, and antiskinning agents.

19. A method of curing a moisture curable composition that is curable independent of ambient moisture conditions and comprising a moisture curable reactant requiring an amount of water for curing and a curing agent that substantially does not contain molecular water including water of hydration, but produces water upon activation, said method comprising activating said curing agent so as to produce from about 50 to about 200% of the amount of the water required for curing said moisture curable reactant wherein said produced water cures said moisture curable reactant.

20. The method of claim 19 wherein the curing agent is a single component or a mixture thereof which individually produce water upon activation.

21. The method of claim 19 wherein the curing agent is selected from the group of water producing materials consisting of metal bicarbonates, metal carbonates, acids, salts of organic acids, metal bisulfates, metal bisulfites, metal phosphates, metal phosphites, and mixtures thereof.

22. The method of claim 19 wherein the curing agent is comprised of at least two materials which react to form water.

23. The method of claim 19 wherein the curing agent is in the form of particles that are dispersed in the moisture curable base.

24. The method of claim 19 wherein the composition is heated to activate said curing agent.

25. The method of claim 24 wherein the composition is heated by at least one of an oven, hot air blower, contact with a heated surface, microwave energy, induction heating, ultraviolet radiation and infrared radiation.

26. The method claim 19 wherein the composition is mixed to activate said curing agent.

27. The method of claim 19 wherein the curing agent is encapsulated.

28. The method of claim 27 wherein the curing agent is activated by heat and is encapsulated in a thermoplastic material that melts at a temperature not higher than the activation temperature of the curing agent and the composition is heated to melt said thermoplastic material and activate said curing agent to cure said composition.

29. The method of claim 27 wherein the curing agent is activated by mixing and is encapsulated in a frangible material and the composition is mixed to fracture said frangible material and activate said curing agent to cure said composition.

30. The method of claim 19 wherein the curing agent is surface treated.

31. The method of claim 19 wherein the moisture curable base is selected from the group consisting of polyurethanes, polysiloxanes, polysulfides, and cyanoacrylic acid esters.

32. The method of claim 31 wherein the moisture curable base comprises a polyurethane.

33. The method of claim 31 wherein the moisture curable base comprises a polysiloxane and said composition further comprises a silane crosslinking agent.

34. The method of claim 31 wherein the moisture curable base comprises a polysulfide and said composition further comprises a peroxide compound or dichromate compound.

35. The method of claim 31 wherein the moisture curable base comprises an alpha-cyanoacrylic acid ester.

* * * * *